US006245699B1

(12) United States Patent
Hudecek et al.

(10) Patent No.: US 6,245,699 B1
(45) Date of Patent: Jun. 12, 2001

(54) HIGH STRENGTH SEALING GLASS

(75) Inventors: Carl J. Hudecek, Perrysburg; Joseph V. Peer, Oregon; Jon G. Bobinski, Waterville, all of OH (US)

(73) Assignee: Techneglas, Inc., Columbus, OH (US)

( * ) Notice: Subject to any disclaimer, the term of this patent is extended or adjusted under 35 U.S.C. 154(b) by 0 days.

(21) Appl. No.: 09/303,297

(22) Filed: Apr. 30, 1999

(51) Int. Cl.$^7$ ............................... C03C 8/04; C03C 8/10; C03C 8/20; C03C 3/074; C03C 3/14
(52) U.S. Cl. ............................ 501/18; 501/15; 501/22; 501/26; 501/32; 501/49; 501/52; 501/76; 501/79; 65/43; 445/24; 445/25
(58) Field of Search ................ 501/15, 18, 22, 501/26, 32, 76, 79, 49, 52; 65/43; 445/24, 25

(56) References Cited

U.S. PATENT DOCUMENTS

| | | |
|---|---|---|
| 2,875,085 | * 2/1959 | Morris et al. . |
| 3,888,686 | 6/1975 | Ellis . |
| 3,922,471 | 11/1975 | Ellis . |
| 3,973,975 | 8/1976 | Francel . |
| 4,006,028 | * 2/1977 | Nofziger . |
| 4,043,824 | * 8/1977 | Wager . |
| 4,589,899 | 5/1986 | Hudecek . |
| 5,013,360 | 5/1991 | Finkelstein et al. . |
| 5,188,990 | 2/1993 | Dumesnil et al. . |
| 5,510,300 | * 4/1996 | Lim et al. ..................... 501/18 |

FOREIGN PATENT DOCUMENTS

WO 97/36836   10/1997   (WO) .

* cited by examiner

*Primary Examiner*—David R Sample
(74) *Attorney, Agent, or Firm*—Porter Wright Morris & Arthur LLP

(57) ABSTRACT

A sealing glass composition in powdered form comprising a crystallizable base glass in the vitreous state and vanadium zirconium silicate in an amount from about 0.1 to 1 weight percent of the base glass. The sealing glass also may contain aluminum oxide having a particle size of about 90 to 99 percent minus 325 mesh in an amount from about 0.1 to 1.0 weight percent of the base glass and bismuth nitrate in an amount from about 0.02 to 0.08 weight percent of the base glass. The glass composition can be used to seal cathode ray tube face plates and funnels with excellent results when heated to a hold range of about 4300 C to 4500 C. The crystallized sealing glass exhibits improved adhesion to seal edges of the face plates and funnels, increased strength, and improved resistance to organic contamination.

45 Claims, No Drawings

HIGH STRENGTH SEALING GLASS

BACKGROUND AND OBJECTS OF THE INVENTION

The present invention is concerned generally with sealing glass compositions, in powdered form or admixed with a vehicle to form a sealing glass paste. More particularly, the present invention is concerned with a sealing glass composition that has excellent adhesion to seal edges, forms high strength devitrified seals, and is highly resistant to organic contamination. The composition is useful in sealing glass components such as cathode ray tubes including television picture tubes.

Crystallizable sealing glass compositions in powdered form are used to provide devitrified glass seals between the face plates (panels) and funnels of cathode ray tubes such as television picture tubes. Such sealing glasses have the property of melting and flowing at low temperatures, i.e., usually below 500° C. and most frequently between about 425° C. and 475° C., which facilitates the wetting of the glass surfaces to be sealed. Sealing glasses (sometimes called "solder" glasses) customarily are thermally devitrifiable or thermally crystallizable in nature. The devitrified or crystallized glass has a melting point higher than the fiber softening point of the original sealing glass.

PbO-containing sealing glasses, and particularly PbO/$B_2O_3$/ZnO sealing glasses, are commonly used as base glasses in commercial sealing glass compositions. Other materials typically are added to the base glass to adjust its properties.

Sealing glasses usually are applied in paste form. The paste is made by adding a vehicle to the sealing glass powder in an amount sufficient to form an extruded ribbon or bead that maintains its shape while the paste is applied to the funnel and the funnel and face plate are sealed. The paste should be reasonably stable for at least three to four hours or more so paste can be applied successively to a large number of funnels to make commercial quantities of television bulbs. The vehicle constituents are pyrolyzable when they are subjected to a temperature below the temperature at which the sealing glass frit is fired such that they leave only an inappreciable amount, if any, of residue in the fired frit.

The face plate and funnel undergo several processing steps before they are sealed together. For example, green, blue and red phosphors are separately and successively applied to the face plate by known techniques such that the phosphors are present as multiple dots or stripes in an ordered arrangement on the inner surface of the face plate. Sometimes a carbon or graphite background is applied to the inner surface of the face plate surrounding the phosphors to provide a sharp contrast to the phosphors. The inner surface of the face plate is then aluminized, i.e., a thin aluminum film is deposited, so that an electrically conductive surface is formed. This aluminized surface is connected to a metal stud on the inner surface of the face plate. Several organic compounds usually are applied to the inner surface of the face plate during phosphor application and aluminization.

After the preparatory face plate and funnel processing steps have been completed, the sealing glass is applied to the seal edge of the funnel. The funnel and face plate are then joined, sealed in a "frit seal" thermal cycle, and cooled. The frit seal thermal cycle typically involves firing in a nonreducing atmosphere at a temperature sufficiently elevated to fuse the sealing glass (generally about 425° C. to 475° C.) and form a strong, adherent hermetic bond of devitrified sealing glass between the face plate and funnel.

After the face plate has been sealed to the funnel, the interior confines of the tube are evacuated by applying a vacuum thereto. The tube must be heated to a temperature of about 280° C. to 410° C. while being evacuated to assure that all volatile substances, such as moisture, adsorbed gases, and organic materials, are liberated and withdrawn from the interior surfaces and confines of the tube. The application of heat to the tube during exhausting inevitably results in some relational shifting of the face plate, funnel and solder glass seal. A strong devitrified seal is necessary to withstand the creation or concentration of physical stresses in the vicinity of the seal resulting from the relational shifting of parts during the heating operation and subsequent cooling.

The PbO in the sealing glass has a natural tendency to be reduced to metallic lead during frit sealing in a reducing atmosphere or in the presence of organic vapors. Seals in which the PbO has been reduced are gray or gray-black in color, indicating the presence of metallic lead, rather than the yellow color that is generally characteristic of devitrified PbO glass. The reduction of PbO hinders adhesion of the sealing glass to the seal edges and induces dielectric breakdown in the resultant seal when the seal is exposed to high voltage conditions such as those existing within a color television tube during its operation. Because the high voltages present in a television tube during its operation in a television set range from about 25 kV to 45 kV or more for a color television tube, any dielectric breakdown in the seal between the funnel and face plate will provide a source of tube malfunctions. A tube with appreciable amounts of metallic lead in its seal is unacceptable for use and is likely to be rejected when the tube undergoes a standard voltage test conducted at the tube manufacturing plant.

Various techniques may be used to prevent or limit reduction of PbO during firing of the glass seal. Some tube manufacturers volatilize or otherwise remove organic contaminants from the face plate before firing of the glass seal. This generally involves a prior heating cycle known as "panel bake." Other tube manufactures use sealing glasses with improved resistance to organic contamination such as those including red lead ($Pb_3O_4$) or another oxidizing agent. The oxidizing agent is preferentially reduced to a lower oxide of the cation in the presence of reducing conditions.

Sealing glasses must have a suitable combination of properties to perform satisfactorily in television picture tubes and the like. For example, the sealing glass must have good stability when mixed as a paste and good tolerance of temperature deviations during the thermal soak time. The sealing glass also must adhere well to the seal edges of the funnels and face plates, form high strength crystallized seals, and resist organic contamination introduced during tube making. The resultant seals must have appropriate thermal expansion characteristics to avoid damage to the tube components during subsequent processing and appropriate dielectric characteristics to prevent failure of the tube when it is exposed to high voltages during use.

Sealing glass developers generally strive to achieve a sealing glass having a satisfactory balance of properties, but it is difficult to achieve this balance. When a sealing glass composition is modified to enhance performance in one area, performance in another area usually becomes less than ideal.

For example, the rate of crystallization and the size and distribution of crystals are important to formation of a strong seal. The ideal crystallization rate is fast but delayed enough to allow adequate chemical bonding of the prepared sealing glass to the face plate and funnel seal edges. Formation of large, fast-growing crystals within the glassy matrix results in an intrinsically strong seal. Crystals that form an interlocking structure rather than flower-like forms are preferred because they provide greater resistance to crack propagation.

U.S. Letters Pat. No. 4,589,899 to Hudecek (the "Hudecek patent"), incorporated herein by reference, discloses a crystallizable $PbO/ZnO/B_2O_3/SiO_2/BaO$ sealing composition in powdered form that has superior crystallization properties. The addition of finely divided zinc zirconium silicate as a nucleating agent enhances the ability of the composition to form strong crystallized seals. It also improves the adhesion of the composition to seal edges over prior art sealing glasses. However, the composition provides only average resistance to organic contamination. A higher resistance to organic contamination would be beneficial in no-panel-bake manufacturing processes (processes in which the screened panel is not given a preliminary pre-bake to drive off organic contamination before frit sealing).

Similarly, U.S. Letters Pat. No. 3,973,975 to Francel et al. (the "Francel patent"), incorporated herein by reference, describes PbO-containing sealing glasses that include certain oxidizing agents in amounts from at least 0.1 to about 1.5% by weight of the sealing glass to control PbO reduction. Sealing glasses such as those taught by Francel are resistant to organic contamination but have not achieved commercial success because of poor flow, excessive porosity and the presence of oxygen bubbles. In addition, when $Pb_3O_4$ is used as an oxidizing agent, the $Pb_3O_4$ acts as a nucleation site for small slow-growing crystals that interfere with growth of a preferred larger crystal and extend the time needed to complete the crystallization to 90 percent or more crystallized. The presence of excess oxidizing agent also interferes with oxidation of the metal getter provided to improve the tube vacuum, reducing the life and effectiveness of the getter.

It is an object of the invention to provide a crystallizable sealing glass in powdered form that has superior characteristics, namely, good stability when mixed as a paste, good tolerance of temperature deviations during the thermal soak time, excellent adhesion to the seal edges, good resistance to organic contamination and the ability to form high strength crystallized seals. The sealing glass is useful in sealing cathode ray tube bulbs, particularly television picture tube bulbs.

It also is an object of the invention to provide a PbO-based sealing glass that resists the chemical reduction of PbO to metallic lead when the sealing glass is exposed to reducing conditions during sealing, particularly in no-panel-bake tube making operations, to produce a seal having suitable dielectric and other properties without the disadvantages associated with prior art sealing glasses.

These and other objects of the present invention will be apparent from the specification that follows, the appended claims, and the drawings.

SUMMARY OF THE INVENTION

These objectives are achieved in a sealing glass composition in powdered form that can be used to seal cathode ray tube bulbs including television picture tube bulbs with a thermal soak temperature of about 430° C. to 450° C. with excellent results.

The sealing glass composition of the present invention comprises a crystallizable base glass and vanadium zirconium silicate in an amount from about 0.1 to 1 weight percent of the base glass, more preferably about 0.3 to 0.7 weight percent. Preferably, the vanadium zirconium silicate generally has a particle size of minus 325 mesh.

The sealing glass composition may further include aluminum oxide having a particle size of about 90 to 99 percent minus 325 mesh, in an amount from about 0.1 to 1.0 weight percent of the base glass, more preferably about 0.2 to 0.4 weight percent of the base glass. Alternatively, the sealing glass may include aluminum oxide particles in an amount from about 0.1 to 1.0 weight percent of the base glass, the aluminum oxide particles being of such size that the surface of the aluminum oxide particles is partially but not totally melted when the composition is heated to about 430° C. to 450° C. for about 17 to 60 minutes.

The vanadium zirconium silicate-containing sealing glass composition also may include bismuth nitrate in an amount from about 0.02 to 0.08 weight percent of the base glass, more preferably about 0.03 to 0.06 weight percent.

In another embodiment of the invention, the vanadium zirconium silicate-containing sealing glass may include aluminum oxide having a particle size of about 90 to 99 percent minus 325 mesh in an amount from about 0.1 to 1.0 weight percent of the base glass and bismuth nitrate in an amount from about 0.02 to 0.08 weight percent of the base glass. More preferably, the amount of vanadium zirconium silicate is about 0.3 to 0.7 weight percent, the amount of aluminum oxide is about 0.2 to 0.4 weight percent, and the amount of bismuth nitrate is about 0.03 to 0.06 weight percent. The base glass particles preferably are smoother and less jagged than the particles of conventional glass frits to improve paste quality.

The above-described sealing glass preferably includes a nucleating agent, which may be zinc zirconium silicate in an amount sufficient to form a devitrified seal suitable for sealing television picture tube components as evidenced by a differential thermal analysis (DTA) peak of 17 to 30 minutes when the composition is heated to a hold range of about 430° C. to 450° C. The nucleating agent also may be a combination of zinc zirconium silicate having a particle size of about 2 to 8 microns and zirconium silicate having a particle size of about 99.98 percent minus 325 mesh. When this combination of nucleating agents is used, the amount of zinc zirconium silicate preferably is about 0.02 to 0.7 weight percent of the base glass and the amount of zirconium silicate preferably is about 0.1 to 0.4 weight percent of the base glass.

The above-described sealing glass may include a filler, preferably zirconium silicate having a particle size of about 90 percent minus 325 mesh. The amount of the zirconium silicate filler may be about 0.1 to 1.0 weight percent of the base glass, more preferably about 0.1 to 0.6 weight percent.

The vanadium zirconium silicate-aluminum oxide-bismuth nitrate sealing glass composition may further include manganese sesquioxide, preferably in an amount from about 0.2 to 1.4 weight percent of the base glass.

The base glass of the sealing glass composition may include the following ingredients in approximate percent by weight:

| Ingredient | Percent by Weight |
| --- | --- |
| PbO | 70 to 80 |
| ZnO | 9 to 16 |

-continued

| Ingredient | Percent by Weight |
|---|---|
| $B_2O_3$ | 5 to 11 |
| $SiO_2$ | 0 to 5 |
| BaO | 0 to 3 |
| $Al_2O_3$ | 0 to 3. |

Preferably, the base glass includes the following ingredients in approximate percent by weight:

| Ingredient | Percent by Weight |
|---|---|
| PbO | 73 to 77 |
| ZnO | 10 to 14 |
| $B_2O_3$ | 7 to 10 |
| $SiO_2$ | 1 to 3 |
| BaO | 1.5 to 2.5, | and more preferably, the following ingredients in approximate percent by weight:

| Ingredient | Percent by Weight |
|---|---|
| PbO | 74.5 to 75.3 |
| ZnO | 12.0 to 13.0 |
| $B_2O_3$ | 7.9 to 8.8 |
| $SiO_2$ | 2.0 to 2.4 |
| BaO | 1.8 to 2.3. |

The sealing glass of the present invention may include the following ingredients in approximate percent by weight:

| Ingredient | Percent by Weight |
|---|---|
| base glass | 96.82 to 99.76 |
| vanadium zirconium silicate | 0.1 to 1.0 |
| fine aluminum oxide | 0.1 to 1.0 |
| bismuth nitrate | 0.02 to 0.08 |
| zinc zirconium silicate | 0.02 to 0.7 |
| fine zirconium silicate | 0 to 0.4 |
| coarse zirconium silicate filler | 0 to 1.0, | more preferably,

| Ingredient | Percent by Weight |
|---|---|
| base glass | 97.24 to 99.15 |
| vanadium zirconium silicate | 0.3 to 0.7 |
| fine aluminum oxide | 0.2 to 0.4 |
| bismuth nitrate | 0.03 to 0.06 |
| zinc zirconium silicate | 0.02 to 0.7 |
| fine zirconium silicate | 0.2 to 0.3 |
| coarse zirconium silicate filler | 0.1 to 0.6. |

When the sealing glass composition includes manganese sesquioxide, the composition may include the following ingredients in approximate percent by weight:

| Ingredient | Percent by Weight |
|---|---|
| base glass | 95.84 to 98.55 |
| vanadium zirconium silicate | 0.3 to 0.7 |
| fine aluminum oxide | 0.2 to 0.4 |
| bismuth nitrate | 0.03 to 0.06 |
| zinc zirconium silicate | 0.02 to 0.7 |
| fine zirconium silicate | 0.2 to 0.3 |
| coarse zirconium silicate filler | 0.5 to 0.6 |
| manganese sesquioxide | 0.2 to 1.4. |

The present invention also provides a sealing glass composition for sealing glass cathode ray tube components, namely, funnels and face plates. The composition includes a crystallizable base glass, vanadium zirconium silicate in an amount from about 0.1 to 1 weight percent of the base glass for improving adhesion of the liquefied sealing glass composition to seal edges of the face plates and funnels, aluminum oxide having a particle size of about 90 to 99 percent minus 325 mesh, in an amount from about 0.1 to 1.0 weight percent of the base glass for increasing the strength of the crystallized sealing glass matrix, and bismuth nitrate in an amount from about 0.02 to 0.08 weight percent of the base glass for improving resistance to organic contamination during sealing of the face plates and funnels. Preferably, the vanadium zirconium silicate generally has a particle size of minus 325 mesh. The base glass preferably is milled to produce smoother, less jagged particles than conventional glass frits.

The above-described sealing glass composition may include zinc zirconium silicate in an amount from about 0.02 to 0.7 weight percent for nucleating controlled crystallization of the sealing glass composition and zirconium silicate in an amount from about 0.1 to 0.4 weight percent for enhancing nucleation and reducing crystallization time. The sealing glass also may include a filler in an amount from about 0 to 1.0 weight percent of the base glass, preferably zirconium silicate having a particle size of about 90 percent minus 325 mesh.

The present invention also provides a method of making a sealing glass composition that forms satisfactory devitrified seals when heated to a hold range of about 430° C. to 450° C. The method includes the steps of:

selecting a crystallizable base glass in the vitreous state;

adding bismuth nitrate to the base glass in an amount from about 0.02 to 0.08 weight percent of the base glass;

blending vanadium zirconium silicate particles in an amount from about 0.1 to 1 weight percent of the base glass into the glass composition; and blending aluminum oxide having a particle size of about 90 to 99 percent minus 325 mesh in an amount from about 0.1 to 1.0 weight percent of the base glass into the glass composition.

The step of adding bismuth nitrate may include the step of uniformly distributing bismuth nitrate in the base glass.

The method further may include the step of providing vanadium zirconium silicate generally having a particle size of minus 325 mesh, adding an effective nucleating amount of zinc zirconium silicate, adding fine zirconium silicate, or adding a filler. The method also may include the step of milling the base glass to produce smoother, less jagged particles than the particles of conventional glass frits. The base glass particles preferably have a sufficiently smooth shape to improve performance of the sealing glass in paste form.

The present invention also provides a method of sealing a glass face plate and funnel. The method includes the steps of:

selecting a crystallizable base glass in the vitreous state;

uniformly distributing bismuth nitrate in an amount from about 0.02 to 0.08 weight percent of the base glass into the base glass;

blending vanadium zirconium silicate in an amount from about 0.1 to 1 weight percent of the base glass into the glass composition;

blending aluminum oxide having a particle size of about 90 to 99 percent minus 325 mesh, in an amount from about 0.1 to 1.0 weight percent of the base glass into the glass composition;

applying a sealing amount of the sealing glass composition between the sealing edges of the face plate and funnel; and subjecting the applied sealing glass composition to a sealing temperature of about 430° C. to 450° C. for a time sufficient to fuse the sealing glass composition and form a seal to and between the sealing edges of the face plate and funnel.

The method may further include the steps of providing vanadium zirconium silicate generally having a particle size of minus 325 mesh, milling the base glass to produce smoother, less jagged particles than the particles of conventional glass frits, or adding an effective amount of at least one nucleating agent such that the crystallizing glass composition has a peak at about 17 to 30 minutes when the composition is heated to the hold range of about 430° C. to 450° C. as evidenced by a DTA curve.

Vanadium zirconium silicate compounds have been used in prior art sealing glass compositions in greater quantities as fillers (i.e., additives that reduce the thermal expansion coefficient of the base sealing glass), as described in U.S. Letters Pat. Nos. 3,888,686 and 3,922,471 to Ellis. Other vanadium compounds have been used in sealing glass compositions as nucleating agents. It is believed that the addition of vanadium zirconium silicate to a sealing glass composition in the amounts described herein is novel. The presence of small amounts of vanadium zirconium silicate in the sealing glass of the present invention, alone or in combination with finely divided alumina, markedly improves adhesion to the seal edges. This improvement is accomplished without diminishing other attributes of the sealing glass. The improved adhesion is enhanced by the presence in the sealing glass of small amounts of an oxidizing agent such as bismuth nitrate.

Alumina also has been used in prior art sealing glass compositions, most typically as a filler. The presence of finely divided alumina, particularly in combination with vanadium zirconium silicate, results in a high strength frit. While not wishing to be bound by theory, it is believed that this result is achieved because the finely divided particles provide greater resistance to crack propagation and are also of a size that allows the surface of the particles to partially but not totally melt when the composition is heated to about 430° C. to 450° C. for about 17 to 60 minutes, thereby strengthening the frit matrix.

DETAILED DESCRIPTION OF THE PREFERRED EMBODIMENT(S)

The present invention provides a sealing glass composition in powdered form. The glass composition has a superior balance of properties, including stability when mixed as a paste, tolerance of temperature deviations during the thermal soak time, adhesion to the seal edges, resistance to organic contamination and the ability to form high strength crystallized seals. A preferred embodiment of the invention useful for sealing cathode ray tubes and particularly television picture tubes is described in detail. The composition also may be useful in other sealing applications.

The composition includes a crystallizable base glass in the vitreous state and additives that enhance adhesion to the sealing edges, intrinsic strength of the crystallized glass, and resistance to organic contamination. The composition also may include additives that enhance controlled crystallization and modify the thermal expansion coefficient of the base glass. The sealing glass composition is stable when mixed as a paste and has good tolerance of temperature deviations during the thermal soak time.

The present invention also includes a method of making a sealing glass composition and a method of sealing a cathode ray tube face plate and funnel. Each of these methods includes the step of adding vanadium zirconium silicate to a base glass.

As described above, the sealing glass composition comprises a base glass and additives that enhance the properties of the sealing glass. These base glass and additives are described in detail below.

A. Base Glass

Lead-zinc-borate solder glasses are preferred in practicing this invention. Such glasses are well known in the solder glass art, and examples can be found in the Hudecek patent. Solder glasses useful as the crystallizable glass component in the composition of the invention are referred to as the "base glass."

The lead-zinc-borate glasses useful in the present invention are prepared by methods known in the art. Suitable glasses typically have an oxide composition (as calculated from raw batch starting materials) with a range specified in Table 1, expressed in weight percent, including all ranges subsumed therein, and in which the total content of all oxides is 100 percent.

TABLE 1

PREFERRED BASE GLASS COMPOSITION

| Oxide | Usual Range | Preferred Range | Particularly Preferred Range |
| --- | --- | --- | --- |
| PbO* | 70–80 | 73–77 | 74.5–75.3 |
| ZnO | 9–16 | 10–14 | 12.0–13.0 |
| $B_2O_3$* | 5–11 | 7–10 | 7.9–8.8 |
| $SiO_2$ | 0–5 | 1–3 | 2.0–2.4 |
| BaO | 0–3 | 1.5–2.5 | 1.8–2.3 |

Although the base glass may be prepared by combining the desired batch constituents, it also may be prepared by combining materials containing two or more of these constituents. For example, an appropriate quantity of $PbO.B_2O_3$ may be substituted for the PbO and $B_2O_3$ constituents, as is customary in the sealing glass art. The base glass composition set forth above in the "Particularly Preferred Range" column is especially well suited for color television picture tube applications.

Other conventional glass making oxides such as CaO, CuO, $Bi_2O_3$, $Na_2O$, $K_2O$, $Li_2O$, CdO, and $Fe_2O_3$ can be included. However, it is preferred in many instances not to include these oxides, but to provide compositions that consist essentially only of the constituents set forth in Table 1, above. Preferably, the constituents of the base glass are provided in stoichiometric amounts such that theoretically all of the constituents will crystallize on heating.

The mean particle size of the base glass frit preferably is about 15 to 23 microns as measured by a Coulter counter. Preferably, substantially all of the particles will pass through a 100 mesh (U.S. Standard Sieve Series) screen (149 microns) and about 65 to 78 percent of the particles will pass through a 400 mesh screen (38 microns).

The base glass can be milled by prior art processes, but modified milling processes produce smoother, less jagged particles than the particles of some prior art-milled glass frits when viewed through an electron microscope. If a short milling time is desired, this may be accomplished, for example, by using large round milling media rather than cylindrical milling media. A small amount of water may be added (i.e., about 0.05 to 0.2 percent) during milling to reduce static electricity. Use of conventional milling techniques for longer than usual periods also may result in smoother base glass particles. The smoother particles result in an improved paste. The improved paste is easier to mix and dispense and generally has greater viscosity stability with time, so it will be more consistent over the 2 to 10 hour typical production dispensing cycle.

In general, results may differ when slightly finer or slightly coarser average particle sizes of powdered sealing glass composition are used. Results also may differ if the base glass is not specially milled to produce smooth particles.

It is also preferred that the base glass used in the practice of this invention have the following properties:

A. A glassy edge of about 360° C. to 390° C., preferably about 370° C., as determined by a gradient boat test;
B. A devitrification edge of about 400° C. to 430° C., preferably about 415° C., as determined by a gradient boat test;
C. A button flow of about 1.050 to 1.120 inches diameter, preferably about 1.080 inches diameter; and
D. A rod stress within the compressional stress range of about 0 psi to 1000 psi, preferably about 300 psi to 800 psi, more preferably about 500 psi.

The terms "gradient boat test," "button flow" and "rod stress" have the same meanings and are determined according to the same procedures set forth in U.S. Letters Pat. No. 4,058,387 to Nofziger.

The results described herein relate to the use of the particularly preferred base glass. However, it is believed that any PbO-containing glass frit having the above described properties and a sealing temperature of about 430° C. to 450° C. can be used with satisfactory results.

B. Additives

The composition of the present invention includes vanadium zirconium silicate for enhancing adhesion of the sealing glass to seal edges Vanadium zirconium silicate typically is used as a ceramic stain. The chemical durability of this composition in other glasses may contribute to its effectiveness in enhancing adhesion. Vanadium zirconium silicate available from Englehard Industries as Harshaw Blue E-202 Stain, has been used in the sealing glass of the present invention with satisfactory results. Other vanadium zirconium silicates having average particles sizes in the range of about 1 to 30 microns also may be suitable. Particles generally having a size of minus 325 mesh are preferred.

The amount of vanadium zirconium silicate stain is generally about 0.1 to 1.0 weight percent, the preferred amount being 0.3 to 0.7 weight percent, although the amount of stain may vary outside these ranges when different particle sizes are used. Vanadium zirconium silicate preferably is added to the sealing glass composition at the blender.

Very fine granular aluminum oxide ($Al_2O_3$ or alumina) may be included for increasing the intrinsic strength of the crystallized sealing glass. The liquefied frit is thought to partially dissolve and bond to the surface of the $Al_2O_3$ particles, which strengthens the frit matrix. Preferably, the aluminum oxide particles are about 98 percent (minimum about 90 percent, maximum about 99 percent) minus 325 mesh, Sedigraph 5100 median micron, 6 to 10 microns. Commercial calcined, ground A-10 alumina, available from Alcan Smelters and Chemicals, Ltd. (Canada), yields acceptable results. Aluminum oxide may be added in an amount from about 0.1 to 1.0 weight percent, the preferred amount being about 0.2 to 0.4 weight percent. The fine alumina particles preferably are added to the sealing glass composition at the blender. It also may be possible to add the alumina particles to the base glass at melt time, although the properties of the resultant sealing glass may be different.

The particle size of the alumina is selected so the surface of the particles will partially but not totally melt under the desired thermal soak conditions, e.g., about 430° C. to 450° C. for about 17 to 60 minutes. Use of substantially larger particles adversely affects wetting and adhesion to seal edges and use of smaller particles that melt totally under these conditions adversely affects flow. Certain prior art glasses, containing about 3 to 5 weight percent of coarser $Al_2O_3$, average particle size about 10 microns, resulted in seals that exhibited poor solder glass flow and re-entrant angles on the seals. Conversely, laboratory tests of the present invention showed that use of about 0.5 weight percent of $Al_2O_3$, finer than A-10 (exact particle size unknown), resulted in a 5 percent decrease in button flow, presumably because the $Al_2O_3$ was dissolved in the base glass, increasing its viscosity.

The composition preferably includes an inorganic oxidizing agent for resisting organic contamination from screening lacquers, emulsions, graphites, phosphors and the like. The oxidizing agent is thermally stable at the temperatures at which the sealing glass frit seals the glass surfaces together but can be reduced to a lower oxidation state when exposed to the reducing conditions. Any reducing agent in contact with the modified sealing glass system while the sealing glass is melting and sealing will preferentially reduce the oxidizing agent to its lower oxidation state rather than reducing the PbO in the sealing glass to metallic lead without causing any substantial adverse effect on the rheology of the sealing glass paste or on the sealing properties of the base glass.

The oxidizing agent preferably is an inorganic nitrate, more preferably bismuth nitrate (e.g., $Bi(NO_3)_3 \cdot 5H_2O$). Other oxidizing agents such as zinc nitrate (e.g., $Zn(NO_3)_2 \cdot 6H_2O$) or red lead (e.g., $Pb_3O_4$) also may yield acceptable results. The bismuth nitrate or other oxidizing agent is added to the glass composition in an amount just sufficient to prevent the PbO in the sealing glass from being chemically reduced when the glass frit is fired in the presence of reducing conditions at a temperature sufficient to seal the glass.

Bismuth nitrate generally is added in an amount from about 0.02 to 0.08 weight percent, the preferred amount being about 0.03 to 0.06 weight percent. This amount of bismuth nitrate added is less than that described in the Francel patent because amounts substantially higher than the preferred amounts will have negative side effects, such as diminished gettering performance and creation of bubbles in the finished seal. The smaller amount of the oxidizing agent cooperates with the vanadium zirconium silicate to achieve a strong bond between the sealing glass and the tube components. Commercial grade granular bismuth nitrate that is ground in a ball mill to reduce the particle size may be used.

The composition of the present invention preferably includes additives for nucleating controlled crystallization of the base glass to form a devitrified seal. Zinc zirconium silicate, a synthetic zirconium double silicate with about 28.6 percent ZnO, 46.2 percent $ZrO_2$, and 24.2 percent $SiO_2$, effectively controls nucleation because it is stable to the corrosive effects of hot sealing glasses and enhances the formation of large $PbO \cdot ZnO \cdot B_2O_3$ crystals, which affect the strength and wetting properties of the sealing glass as described in the Hudecek patent. The zinc zirconium silicate particles preferably are about 2 to 8 microns, more preferably about 3 to 6 microns. The amount of zinc zirconium silicate is sufficient to form a devitrified seal suitable for sealing television picture tube components as evidenced by a DTA peak of 17 to 30 minutes when the composition is heated to a hold range of about 430° C. to 450° C. The amount of zinc zirconium silicate is generally about 0.02 to 0.7 weight percent based on the weight of the base glass, depending on the potency and particle size of the zinc zirconium silicate. Preferably, the zinc zirconium silicate is added to the base glass before or during grinding of the base glass in a ball mill.

Very fine granular zirconium silicate ($ZrO_2 \cdot SiO_2$) having a particle size of about 99.98 percent minus 325 mesh, with a Fisher average particle diameter (APD) number of about 1.3, optimizes crystallization by nucleating small $PbO \cdot ZnO \cdot B_2O_3$ crystals. The presence of effective amounts of granular zirconium silicate generally is evidenced by a faster DTA peak time. Commercial grade TRM 13-04, wet milled Zircopax, available from TAM Ceramics, Inc. (Niagara Falls, New York), is suitable. The amount of Zircopax generally is about 0.1 to 0.4 weight percent, the preferred amount being about 0.2 to 0.3 weight percent. Other nucleating agents known in the art that favor formation of small $PbO \cdot ZnO \cdot B_2O_3$ may be used in place of Zircopax.

The composition may include a filler for reducing the thermal expansion coefficient of the sealing glass to a level appropriate for use with color television picture tube components. The filler preferably is coarse granular zirconium silicate ($ZrO_2 \cdot SiO_2$), which also increases the intrinsic strength (i.e., rod strength) of the crystallized sealing glass. Preferably, the zirconium silicate filler has a particle size of about 90 percent minus 325 mesh, Fisher APD number of about 4.2 microns. Commercial grade, dry milled coarse zirconium silicate such as G-Zircon, available from TAM Ceramics, Inc., is suitable. The particle size of the G-Zircon approximates the particle size of the base glass. When used, the amount of G-Zircon is generally about 0.1 to 1.0 weight percent, the preferred amount being about 0.5 to 0.6 weight percent. Although G-Zircon is a particularly preferred filler, other fillers known in the sealing glass art, such as cordierite, willemite (zinc silicate), tin oxide, lead titanate, β-eucryptite, and β-spodumene, also may yield satisfactory results.

The sealing glass composition including a base glass and the above-described additives will have a blue-green color. Addition of a coloring agent to produce a black frit is possible, but this mask the visual indicator of how well the oxidizing agent is performing because oxidation of PbO in the sealing glass causes blackening of the frit. Addition of a coloring agent also may make it more difficult to observe crystallization even under a microscope. Nevertheless, manganese sesquioxide (commercial grade, such as that available from Chem Metals) or another coloring agent may be added to the sealing glass composition if a black frit color is desired. When used, the amount of manganese sesquioxide preferably is about 0.2 to 1.4 weight percent. The presence of manganese sesquioxide may enhance resistance to organic contamination because manganese sesquioxide is an oxidizing agent, but manganese sesquioxide is not intended as a substitute for bismuth nitrate.

Commercial grades of the above described additives generally have been found suitable for use in this invention. The hydration states of these additives are not thought to be critical, and it is expected that these additives also would yield satisfactory results in hydration states other than those specified.

The sealing glass may be prepared by combining the base glass with the additives. Optimal results may be obtained by combining the additives with the base glass at different stages or by different routes. For example, certain additives, such as bismuth nitrate and fine zirconium silicate, preferably are intimately and homogeneously dispersed in the base glass. This may be accomplished by adding these constituents to base glass chips in a ball mill and mixing for an appropriate time. Alternatively, if more rapid sealing glass preparation is desired, an additive may first be incorporated into a masterblend (a blend of base glass with a higher concentration of the additive) which can be dispersed in the sealing glass composition during blending. Other additives such as vanadium zirconium silicate stain, fine alumina particles, and manganese sesquioxide, preferably are added to the sealing glass composition during the final blending stage. The zinc zirconium silicate, coarse alumina, and any filler(s) may be added during any desired stage of sealing glass preparation.

The sealing glass composition is prepared by milling the base glass chips with any additives added during the milling stage, then mixing the milled material with appropriate quantities of any masterblends and other additives added at the blender until the desired composition is achieved.

Typical physical properties for a sealing glass prepared using the particularly preferred base glass and the preferred additives (omitting the optional manganese sesquioxide) are:

Particle Size:
100% particles minus 100 mesh (149 microns)
About 70 weight percent minus 400 mesh (38 microns)

| Thermal contraction coefficient: | About $103 \times 10^{-7}$/C. (450° C. to room temperature) |
|---|---|
| Annealing point: | About 310° C. |
| Softening point: | About 370° C. |
| Dielectric constant: | 21.2 (250° C. at 1 MHz) |
| Power Factor: | 1.7% (250° C. at 1 MHz) |
| Volume Resistivity | 8.3 (log Ohm-cm at 250° C.) |
| | 6.8 (log Ohm-cm at 350° C.) |
| Chemical Resistance: | 6.8 $Mg/cm^2$ (HCl) |
| | 4.7 $Mg/cm^2$ (HF) |
| | 2.8 $Mg/cm^2$ ($H_2O$) |

A sealing glass paste of the present invention may be prepared by mixing the sealing glass with a vehicle using known methods. The weight ratio of sealing glass solids (including base glass and additives) to vehicle is usually in the range or about 11.0:1 to 13.0:1, and preferably about 12.0:1 to 12.5:1. A mixing time of about 30 to 60 minutes is recommended. A sealing glass paste prepared using the sealing glass composition of the present invention demonstrated increased stability in paste viscosity during use compared to a paste made using the same vehicle and a conventional frit.

The sealing glass paste is applied to the sealing edges of CRT and television picture tube funnels. The funnel with applied, unfired frit is then dried to remove volatile organic components. The preferred frit seal thermal cycle is a heat-up rate of about 3 to 5° C. per minute until a hold temperature of about 430° C. to 450° C. is reached. The preferred hold time at this peak temperature is about 30 to 45 minutes. The preferred cool down rate is 5° C. per minute. Other cycle times and temperatures also may yield acceptable results, with longer times generally correlating to lower temperatures and shorter time generally correlating to higher temperatures.

The following working example is illustrative of a typical sealing glass made according to the present invention.

EXAMPLE

A sealing glass with 74.8 percent PbO, 12.7 percent ZnO, 8.4 percent $B_2O_3$, 2.0 percent BaO and 2.1 percent $SiO_2$ was melted and formed into chips. The chips were then ground in a ball mill (using round media) with 0.04 percent zinc zirconium silicate to form a nucleated powder. To this powder, 0.6 percent vanadium zirconium silicate, 0.20 percent A-10 alumina powder, 0.05 percent bismuth nitrate, 0.60 percent G-Zircon and 0.24 percent Zircopax zirconium silicate were incorporated by blending.

The sealing glass composition of the present invention has been used to seal the face plates and funnels of cathode ray tubes such as television picture tubes. The crystallized seals exhibited better adhesion to seal edges, reduced dielectric breakdown, and comparable chemical durability when compared with conventional frit seals.

The seal strength of the solder glass of the present invention was higher than the seal strength of a competitor's sealing glass as measured using a "press" or compressive crush test. This test subjects a 0.6 cm thick, 0.3 cm diameter sample of fired solder glass to crushing pressure by a 1 cm×1 cm square-faced die. The force required to break the sample is noted. Ten samples of solder glass of the invention and a competitor's solder glass were tested and the mean crushing force for each was calculated.

The measured properties of the devitrified glass that resulted from heating the sealing glass of the present invention were excellent. Typical properties for the sealing glass of the present invention are described below. Button flow generally was about 1.079 inches at 440° C. for 60 minutes. Rod seal value generally was about 620 psi compression at 440° C. for 60 minutes when sealed to a reference glass with an average linear coefficient of expansion (25° to 300° C.) of $95 \times 10^{-7}/°$ C. Gradient boat value was about 370 C. (Tse) and 421 C. (Tce).

Throughout this specification, when a range of conditions or a group of substances is defined with respect to a particular characteristic (e.g., temperature, pressure, time and the like) of the present invention, the present invention relates to and explicitly incorporates every specific member and combination of subranges or subgroups therein. Any specified range or group is to be understood as a shorthand way of referring to every member of a range or group individually as well as every possible subrange and subgroup encompassed therein; and similarly with respect to any subranges or subgroups therein.

Although a specific embodiment of the invention has been described in detail, it is understood that variations may be made thereto by those skilled in the art without departing from the spirit of the invention or the scope of the appended claims.

What is claimed is:

1. A sealing glass composition, comprising:
   a crystallizable base glass; and
   vanadium zirconium silicate in an amount from about 0.1 to 1 weight percent of the base glass.

2. The sealing glass composition according to claim 1, wherein the amount of vanadium zirconium silicate is about 0.3 to 0.7 weight percent of the base glass.

3. The sealing glass composition according to claim 1, wherein the vanadium zirconium silicate generally has a particle size of minus 325 mesh.

4. The sealing glass composition according to claim 1, further comprising:
   aluminum oxide having a particle size of about 90 to 99 percent minus 325 mesh in an amount from about 0.1 to 1.0 weight percent of the base glass.

5. The sealing glass composition according to claim 4, wherein the amount of aluminum oxide is about 0.2 to 0.4 weight percent of the base glass.

6. The sealing glass composition according to claim 1, further comprising:
   aluminum oxide particles in an amount from about 0.1 to 1.0 weight percent of the base glass, the aluminum oxide particles being of such size that the surface of the aluminum oxide particles is partially but not totally melted when the composition is heated to about 430° C. to 450° C. for about 17 to 60 minutes.

7. The sealing glass composition according to claim 1, further comprising:
   bismuth nitrate in an amount from about 0.02 to 0.08 weight percent of the base glass.

8. The sealing glass composition according to claim 7, wherein the amount of bismuth nitrate is about 0.03 to 0.06 weight percent of the base glass.

9. The sealing glass composition according to claim 1, further comprising:
   aluminum oxide having a particle size of about 90 to 99 percent minus 325 mesh in an amount from about 0.1 to 1.0 weight percent of the base glass; and
   bismuth nitrate in an amount from about 0.02 to 0.08 weight percent of the base glass.

10. The sealing glass composition according to claim 9, wherein the amount of vanadium zirconium silicate is about 0.3 to 0.7 weight percent of the base glass, the amount of aluminum oxide is about 0.2 to 0.3 weight percent of the base glass, and the amount of bismuth nitrate is about 0.03 to 0.06 weight percent of the base glass.

11. The sealing glass composition according to claim 9, further comprising:
    a nucleating agent.

12. The sealing glass composition according to claim 11, wherein the nucleating agent comprises zinc zirconium silicate.

13. The sealing glass composition according to claim 12, wherein the amount of zinc zirconium silicate is sufficient to form a devitrified seal suitable for sealing television picture tube components as evidenced by a DTA peak of 17 to 30 minutes when the composition is heated to a hold range of about 430° C. to 450° C.

14. The sealing glass composition according to claim 1, wherein the nucleating agent comprises zinc zirconium silicate having a particle size of about 2 to 8 microns and zirconium silicate having a particle size of about 99.98 percent minus 325 mesh.

15. The sealing glass composition according to claim 14, wherein the amount of zinc zirconium silicate is about 0.02 to 0.7 weight percent of the base glass and the amount of zirconium silicate nucleating agent is about 0.1 to 0.4 weight percent of the base glass.

16. The sealing glass composition according to claim 11, further comprising a filler in an amount from about 0.1 to 1.0 weight percent of the base glass.

17. The sealing glass composition according to claim 16, wherein the filler comprises zirconium silicate filler having a particle size of about 90 percent minus 325 mesh.

18. The sealing glass composition according to claim 17, wherein the amount of zirconium silicate filler is about 0.1 to 0.6 weight percent of the base glass.

19. The sealing glass composition according to claim 9, further comprising:

manganese sesquioxide.

20. The sealing glass composition according to claim 19, wherein the amount of manganese sesquioxide is about 0.2 to 1.4 weight percent of the base glass.

21. The sealing glass composition according to claim 1, wherein the base glass comprises the following ingredients in approximate percent by weight:

| Ingredient | Percent by Weight |
| --- | --- |
| PbO | 70 to 80 |
| ZnO | 9 to 16 |
| B$_2$O$_3$ | 5 to 11 |
| SiO$_2$ | 0 to 5 |
| BaO | 0 to 3 |
| Al$_2$O$_3$ | 0 to 3. |

22. The sealing glass composition according to claim 21, wherein the base glass comprises the following ingredients in approximate percent by weight:

| Ingredient | Percent by Weight |
| --- | --- |
| PbO | 73 to 77 |
| ZnO | 10 to 14 |
| B$_2$O$_3$ | 7 to 10 |
| SiO$_2$ | 1 to 3 |
| BaO | 1.5 to 2.5. |

23. The sealing glass composition according to claim 22, wherein the base glass comprises the following ingredients in approximate percent by weight:

| Ingredient | Percent by Weight |
| --- | --- |
| PbO | 74.5 to 75.3 |
| ZnO | 12.0 to 13.0 |
| B$_2$O$_3$ | 7.9 to 8.8 |
| SiO$_2$ | 2.0 to 2.4 |
| BaO | 1.8 to 2.3. |

24. The sealing glass composition according to claim 9, wherein the composition comprises the following ingredients in approximate percent by weight:

| Ingredient | Percent by Weight |
| --- | --- |
| base glass | 96.82 to 99.76 |
| vanadium zirconium silicate | 0.1 to 1.0 |
| very fine granular aluminum oxide | 0.1 to 1.0 |
| bismuth nitrate | 0.02 to 0.08 |
| zinc zirconium silicate | 0.02 to 0.7 |
| very fine granular zirconium silicate | 0 to 0.4 |
| coarse granular zirconium silicate filler | 0 to 1.0. |

25. The sealing glass composition according to claim 24, wherein the composition comprises the following ingredients in approximate percent by weight:

| Ingredient | Percent by Weight |
| --- | --- |
| base glass | 97.24 to 99.15 |
| vanadium zirconium silicate | 0.3 to 0.7 |
| very fine granular aluminum oxide | 0.2 to 0.4 |
| bismuth nitrate | 0.03 to 0.06 |
| zinc zirconium silicate | 0.02 to 0.7 |
| very fine granular zirconium silicate | 0.2 to 0.3 |
| coarse granular zirconium silicate filler | 0.1 to 0.6. |

26. The sealing glass composition according to claim 9, wherein the composition comprises the following ingredients in approximate percent by weight:

| Ingredient | Percent by Weight |
| --- | --- |
| base glass | 95.84 to 98.55 |
| vanadium zirconium silicate | 0.3 to 0.7 |
| very fine granular aluminum oxide | 0.2 to 0.4 |
| bismuth nitrate | 0.03 to 0.06 |
| zinc zirconium silicate | 0.02 to 0.7 |
| very fine granular zirconium silicate | 0.2 to 0.3 |
| coarse granular zirconium silicate filler | 0.5 to 0.6 |
| manganese sesquioxide | 0.2 to 1.4. |

27. The sealing glass composition according to claim 9, wherein the base glass particles are milled using large round milling media.

28. A sealing glass composition for sealing a glass face plate and funnel, comprising:

a crystallizable base glass;

vanadium zirconium silicate in an amount from about 0.1 to 1 weight percent of the base glass for improving adhesion of the liquefied sealing glass composition to seal edges of the face plate and funnel;

aluminum oxide having a particle size of about 90 to 99 percent minus 325 mesh in an amount from about 0.1 to 1.0 weight percent of the base glass for increasing the strength of the crystallized sealing glass matrix; and bismuth nitrate in an amount from about 0.02 to 0.08 weight percent of the base glass for improving resistance to organic contamination during sealing.

29. The sealing glass composition according to claim 28, wherein the vanadium zirconium silicate generally has a particle size of minus 325 mesh.

30. The sealing glass composition according to claim 28, wherein the base glass is milled using large round milling media to produce smooth particles.

31. The sealing glass composition according to claim 28, further comprising:

zinc zirconium silicate in an amount from about 0.02 to 0.7 weight percent for nucleating controlled crystallization of the sealing glass composition; and zirconium silicate in an amount from about 0.1 to 0.4 weight percent for enhancing nucleation and reducing crystallization time.

32. The sealing glass composition according to claim 31, further comprising:

a filler in an amount from about 0.1 to 1.0 weight percent of the base glass.

33. The sealing glass composition according to claim 32, wherein the filler comprises zirconium silicate having a particle size of about 90 percent minus 325 mesh.

34. A method of making a sealing glass composition that forms satisfactory devitrified seals when heated to a hold range of about 430° C. to 450° C., said method comprising the steps of:

selecting a crystallizable base glass in the vitreous state;

adding bismuth nitrate to the base glass in an amount from about 0.02 to 0.08 weight percent of the base glass;

blending vanadium zirconium silicate particles in an amount from about 0.1 to 1 weight percent of the base glass into the glass composition; and blending aluminum oxide having a particle size of about 90 to 99 percent minus 325 mesh in an amount from about 0.1 to 1.0 weight percent of the base glass into the glass composition.

35. The method according to claim 34, further comprising the step of:

providing vanadium zirconium silicate generally having a particle size of minus 325 mesh.

36. The method according to claim 34, wherein the step of adding bismuth nitrate further comprises the step of uniformly distributing bismuth nitrate in the base glass.

37. The method according to claim 34, further comprising the step of:

milling the base glass using large round milling media to produce smooth particles.

38. The method according to claim 37, wherein the base glass particles have a mean particle size of 15–23 microns.

39. The method according to claim 34, further comprising the steps of:

adding an effective nucleating amount of zinc zirconium silicate.

40. The method according to claim 34, further comprising the step of:

adding very fine granular zirconium silicate.

41. The method according to claim 34, further comprising the step of:

adding a filler.

42. A method of sealing glass face plates and funnels, comprising the steps of:

selecting a crystallizable base glass in the vitreous state;

uniformly distributing bismuth nitrate in an amount from about 0.02 to 0.08 weight percent of the base glass into the base glass;

blending vanadium zirconium silicate in an amount from about 0.1 to 1 weight percent of the base glass into the glass composition;

blending aluminum oxide having a particle size of about 90 to 99 percent minus 325 mesh in an amount from about 0.1 to 1.0 weight percent of the base glass into the glass composition;

applying a sealing amount of the sealing glass composition between the sealing edges of the face plate and funnel; and subjecting the applied sealing glass composition to a sealing temperature within the sealing temperature range of between about 430° C. and 450° C. for a time sufficient to fuse the sealing glass composition and form a seal to and between the sealing edges of the face plate and funnel.

43. The method of claim 42 further comprising the step of:
providing vanadium zirconium silicate generally having a particle size of minus 325 mesh.

44. The method according to claim 42, further comprising the step of:

milling the base glass using large round milling media to produce smooth particles.

45. The method according to claim 42, further comprising the step of:

adding an effective amount of at least one nucleating agent such that the crystallizing glass composition has a peak at about 17 to 30 minutes when the composition is heated to the hold range of about 430° C. to 450° C. as evidenced by a DTA curve.

* * * * *